July 21, 1964   G. W. RIECKENBERG   3,141,343
MOTION-TRANSMITTING DEVICE
Filed June 14, 1962   2 Sheets-Sheet 1

*INVENTOR.*
GEORGE W. RIECKENBERG
BY
ATTORNEYS

July 21, 1964 G. W. RIECKENBERG 3,141,343
MOTION-TRANSMITTING DEVICE
Filed June 14, 1962 2 Sheets-Sheet 2
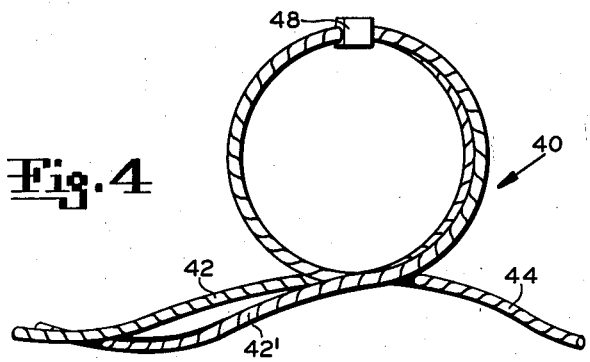
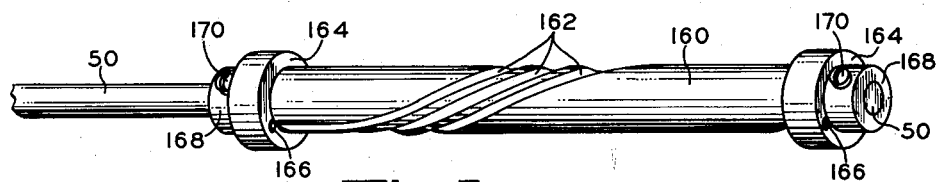
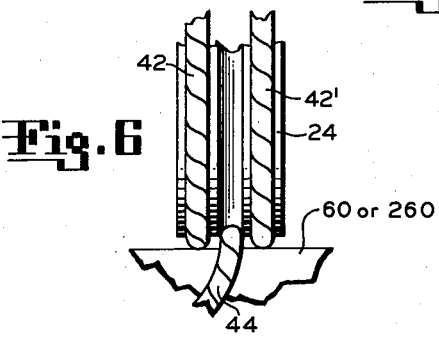
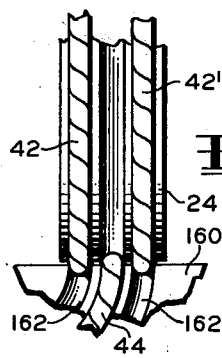
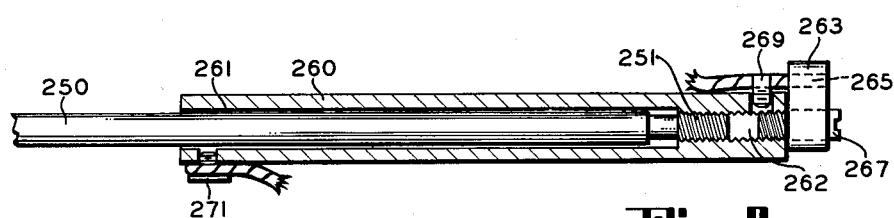
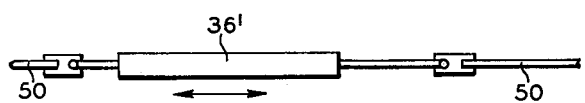
INVENTOR.
GEORGE W. RIECKENBERG
ATTORNEYS

United States Patent Office 3,141,343
Patented July 21, 1964

3,141,343
MOTION-TRANSMITTING DEVICE
George W. Rieckenberg, Portage, Ind., assignor to The Anderson Company, a corporation of Indiana
Filed June 14, 1962, Ser. No. 202,592
15 Claims. (Cl. 74—95)

This invention relates generally to a motion-transmitting device and more specifically is concerned with a motion-transmitting device for driving windshield wipers. The mechanism is particularly adaptable for efficiently converting rotary, oscillatory or reciprocatory motion of a windshield wiper motor to oscillatory motion of a pivot shaft receiving windshield wiper blades.

With the advent of the curved and wrap-around windshields, additional difficulty has been encountered in effectively transmitting power from the wiper motor to the pivot shaft because the pivot shafts, which receive the wiper arm, project through the cowling at a divergent and upward angle with respect to the fore-and-aft extent of the automobile body. The drive motor output shaft is most often horizontally disposed, but may be disposed in other directions. These pivot shafts receive the arms which carry the wiper blades for oscillatory motion across the windshield. In some installations involving a drive for such shafts, it may not be feasible to place the drive motor in a position so that it can transmit linear motion to the pivot shaft along a line which is perpendicular to each pivot shaft. Such linear motion is most often transmitted at an oblique angle to the axis of the pivot shaft. Therefore, apparatus is provided in this invention to permit efficient drive from any of the type of drive motor above mentioned to oscillatory output shafts along a line disposed at an oblique angle to the pivot shafts and which additionally provides a great deal of flexibility in installation and operation.

An object of this invention is to provide an improved windshield wiper motion-transmitting mechanism.

Another object of this invention is to provide an improved windshield wiper motion-transmitting mechanism which is adapted to transmit generally reciprocatory input motion from a power source generally along a line disposed at an oblique angle to an oscillatory output drive shaft.

Another object of this invention is to provide a motion-transmitting device for transmitting motion from a windshield wiper drive motor to a pivot shaft at an angle thereto employing linkage which is adapted to adjust itself to operating conditions.

Other objects and advantages of this invention will become apparent after the description hereinafter set forth is considered in conjunction with the drawings annexed hereto.

In the drawings:

FIGURE 4 shows the flexible cable for use in providing a connection between drive elements;

FIGURE 5 shows a variation of one of the elements of FIGURE 3;

FIGURE 6 is an enlarged view of the arrangement in FIGURE 3 showing the cable drive;

FIGURE 7 is an enlarged view of the arrangement similar to FIGURE 3 but employing the structure as disclosed in FIGURE 5;

FIGURE 8 is a still further variation of FIGURE 3 shown partly in cross section;

FIGURE 8a represents schematically a reciprocatory drive motor as an alternate to the rotary or oscillatory drive motor employed in FIGURES 1 and 2.

Figure 1:
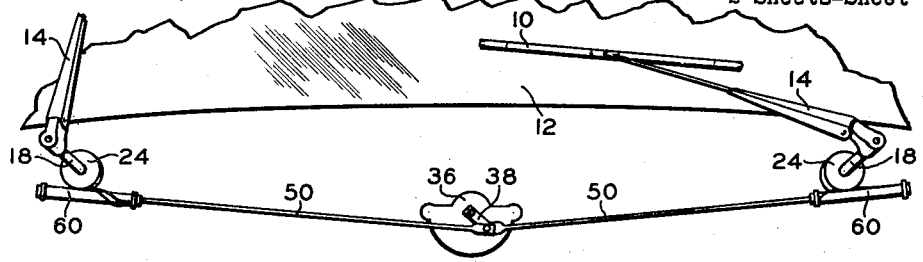
FIGURE 1 is a front schematic arrangement showing my device for transmitting motion from a power source to a pair of windshield wipers.

My device is an improved mechanism for driving windshield wiper blades 10 in an oscillatory path across a windshield 12 for clearing foreign matter therefrom for improved visibility.

The windshield wiper 10 consists of an elongate wiping blade. This blade is supported by a plurality of articulated elements which are arranged in a manner to transmit pressure thereto from a pressure-applying oscillatable wiper arm 14. Pressure is applied to the wiping element at spaced-apart points for urging the wiping element toward a windshield 12 for wiping engagement.

Oscillatory arms 14 are received on pivot shafts 18 which are adapted to be driven from power means 36 or 36'. The power means may be electrically or fluid driven to provide generally oscillatory output motion, including rotary and reciprocatory.

In this specification, only one of the driving linkage will be described because the other, in most instances, is substantially a duplicate thereof.

Figure 3:
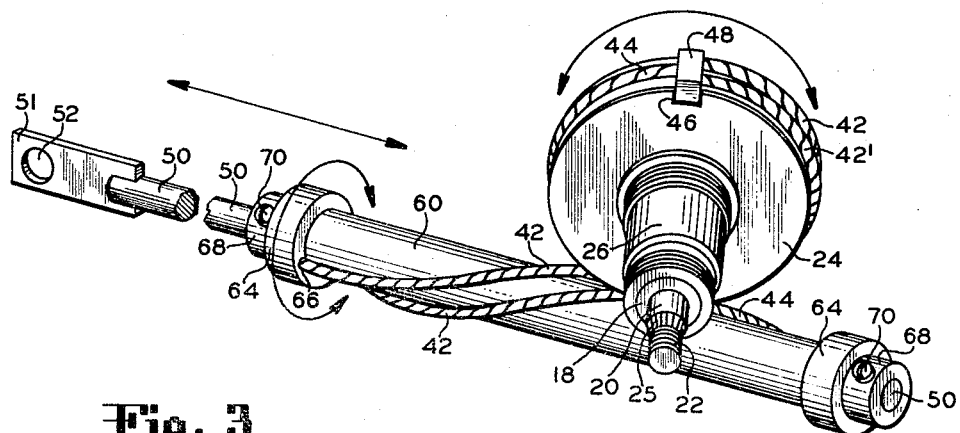
FIGURE 3 is a view of the motion-transmitting mechanism including a flexible connection.

The driving connection between bar, link or pitman 50 and pivot shaft 18 is most clearly shown in FIGURE 3. Pivot shaft 18 is rotatably mounted within a sleeve housing 26 which is adapted to be fixedly secured through the body of an automobile beneath the windshield. One end of pivot shaft 18 fixedly receives pulley 24 for oscillation therewith. Pulley 24 is provided with three peripheral grooves for receiving flexible cables 42, 42' and 44 in driving relationship. A transverse generally rectangular slot 46 is provided on the peripheral surface of the pulley establishing a recess for anchoring generally rectangular block 48 to hold the flexible cables. The other end of pivot shaft 18 has a reduced portion 20 and a threaded end 22. Truncated cone section 25 is splined or serrated to cooperatively receive a receiving head of wiper arm 14 which is secured thereon by a nut (not shown) threaded on end 22 or other equivalent means.

Link, bar or pitman 50, which transmits motion from motor 36 to the pivot shaft, is elongate in form. One end is provided with a flat head 51 having an opening 52 therein for connection to crank 38 of motor 36. Bar 50 would likewise be operatively received by motor 36' when the reciprocatory drive, as shown in FIGURE 8a, is used. Bar 50 may be of many forms, but applicant prefers a rod of cylindrical cross section, as shown in FIGURE 3. In any event, the other or outer end of bar 50 adjacent pulley 24 is provided with a cylindrical bearing portion for rotatably receiving spool 60 thereon. Spool 60, including a rim 64 at each end, is of cylindrical form and is rotatably mounted on the outer end of bar 50, and is retained in axial position thereon by means of spaced-apart lock collars 68 having set screws 70 or the like for fixedly engaging bar 50.

Spool 60 is adapted to lie in proximity to the periphery of pulley 24 and be operatively connected thereto by above-mentioned cables 42, 42' and 44.

More specifically, FIGURES 3 and 4 show the drive cables which consist of dual cables 42, 42' extending in one direction from block 48 and single cable 44 extending in the other direction. Block 48 is adapted to be received in slot 46 and provide an anchor for the cable ends. Cables 42, 42' and cable 44 extend in opposite directions in respective grooves disposed in the periphery of pulley 24. As shown in FIGURES 6 and 7, the pulley grooves are of a depth to receive slightly less than half the cable diameter. The cables surround pulley 24 and extend tangentially therefrom in opposite directions at their point of contact with the surface of spool 60.

Spaced-apart flanges 64 of spool 60 are provided with relative angularly displaced holes 66 which are adapted to receive ends of the cables in a manner whereby the cables are helically disposed on the cylindrical outer surface of spool 60. The cable ends may be soldered or otherwise secured in the holes of the flanges. Equivalent anchoring means can be used for securing the cable ends to the flanges or at other spaced-apart locations on the spool.

As shown in FIGURE 3, the helical angle at which cables 42, 42′ and 44 are disposed on the cylindrical portion of the spool is relatively steep. This angle can be varied depending upon the dictated angle at which the line of drive from motor 36, 36′, represented by bar 50, crosses the axis of pivot shaft 18. In the majority of installations, the axis of bar 50 and pivot shaft 18 will be disposed at an angle from 60 to 90 degrees.

The length of spool 60 can be varied depending upon the diameter of pulley 24 and the angle of oscillation to be applied to pulley 24 and pivot shaft 18.

Upon operation of motor 36, crank 38 is either oscillated through an arc of approximately 180 degrees or continuously rotated through 360 degrees, depending upon the type of motor used. This motion is translated by link or bar 50 into a generally reciprocal or axial motion of spool 60. Reciprocating spool 60 oscillates pulley 24 and shaft 18 through the helically disposed cables 42, 42′ and 44. Since the axis of shaft 18 is disposed at an angle with respect to the axis of spool 60, which angle corresponds to the angle of the helical disposition of the cables on the surface of spool 60, the cables wrap tangentially onto and off of the pulley grooves without any lateral misalignment therewith. This is because spool 60 is freely pivotally mounted for rotation about its longitudinal axis on bar 50. In situations where the relative angle of intersection of the axes of bar 50 and pivot shaft 18 is acute, sleeve 60 will be required to oscillate through a greater number of degrees than when the axes cross at or near right angles. The helical angle of the cables on spool 60 is dictated by the relative angles by which the axes of bar 50 and pivot shaft 18 are disposed. Spool 60 rotates on bar 50 just enough to establish alignment of the cables with their respective grooves on pulley 24.

In operation, it has been found that spool 60, having an internal cylindrical bore received on a cylindrical portion of bar 50, provides a sufficient bearing surface to permit the slight pivotal movement required of the spool. Other obvious bearing means may be provided for increased efficiency, if desired. Spool 60 may be longitudinally positioned on bar 50 by repositioning lock collars 68.

Cables 42, 42′ and 44, once drawn taut, remain in contact with the cylindrical surface of spool 60 because their assumed helical position represents the shortest distance between angularly disposed anchor means at opposite ends of the spool. The disposition of the cable tends to keep the spool and pulley in close proximity and prevents slack or radial displacement therebetween.

An alternate spool 160 is shown in FIGURE 5. Three helically disposed grooves 162 are provided on the cylindrical surface thereof for receiving cables 42, 42′ and 44, as previously described. The spool is provided with rims 164 and cable anchor means 166, as in the disclosure of FIGURE 3. Lock collars 168, having set screws 170, retain the spool on bar 50, as previously described. Grooves 162 receive the cables to a depth slightly less than half the diameter of the cables, as shown in FIGURE 7. In FIGURE 7 as in FIGURE 6, it is clear that the pulley and spool are spaced apart by the interposed cable.

FIGURE 8 shows a still further modification of the spool. In this disclosure, spool or sleeve 260 has a bore 261 with an internal threaded end 262. Bar or link 250 (corresponding to element 50 in the other figures) is provided with threaded end 251 to be received in threads 262 of the spool. It is obvious that the threading therebetween will permit limited initial linear adjustment of sleeve 260 on link 250 for proper installation. Thereafter, the engaging threads retain the spool on the link and permit relative rotation of the spool thereon for establishing alignment of the cables on pulley 24.

Cap screw 267 retains cable anchor 263 at one end of the spool for receiving an end of cable 44. The cable end is received in opening 265 and soldered or otherwise retained therein. Cable 44 is also threaded through a slot in positioning cap screw 269. An additional screw 271 is provided on the other end of spool 260 for receiving cables 42, 42′. The cables are helically received on the cylindrical surface of sleeve 260 substantially as described for FIGURE 3. The angular displacement of anchor screws 269 and 271 determines the helical angle of the cable disposed therebetween.

It is to be understood, of course, that while applicant's pulley 23 is circular, it can be made in other obvious shapes as well; for example, elliptical.

Figure 2:
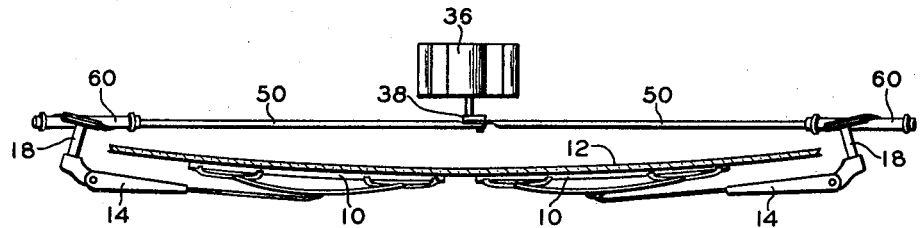
FIGURE 2 is a schematic plan view of the structure shown in FIGURE 1, but showing both blades at their innermost extent of travel for purposes of illustration.

It was previously mentioned that only half, that is, one bar, spool and pulley, would be described because, as shown in FIGURES 1 and 2, one side is substantially a mirror image of the other. It is deemed within the spirit of this disclosure that, in some instances, installations may arise where the drive motor is not located equidistant between the pivot shafts. In this situation, one link would necessarily be longer than the other. It is also to be understood that angular disposition between the line of motion of the links may cross the respective axis of the spaced pivot shafts at angles of different value. In such instances, the helical disposition of the cables on one spool or sleeve would be steeper than the other. Likewise, it is anticipated that one link might cross the pivot shaft at a right angle, in which case the cable would not be helically disposed on the spool but would be linear therewith. The above-mentioned situations are likely to occur when the pivot shafts for the arms are not symmetrically located on the automobile.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. In combination:
    an elongate driver having an end adapted for connection to a power means,
    means carried by said driver and rotatable with respect thereto and spaced from said end,
    a driven element adapted for oscillation about a fixed axis disposed at an oblique angle with reference to the longitudinal axis of said driver,
    and flexible means connected to said driven element and having portions connected to said means at spaced locations in a manner whereby to effect movement of said driven element relative to said driver in response to the operation of said power means.

2. Motion-transmitting structure comprising an elongate driver provided with means for attaching the same to the operating means,
    roller means carried by said driver and rotatable about its longitudinal axis,
    a driven element adapted to be mounted for movement about an axis disposed at an oblique angle with reference to the said axis of said driver,
    and flexible means operatively connected to said driven element and having portions connected to said roller means at longitudinally spaced locations in a manner to render said driven element responsive to the operation of said driver.

3. A subassembly adapted for use as a component of a motion-transmitting structure,
    said subassembly comprising an elongate driver provided with means adjacent one of its extremities for attaching the driver to an operating means, roller means carried by said driver and being movable relative to its longitudinal axis, said roller means being spaced longitudinally from said attaching means, and flexible means adapted for operative attachment to a driven element and having ends connected to said roller means at two locations which are spaced both longitudinally and circumferentially with respect thereto whereby at least portions of said flexible means will partially embrace said roller means.

4. A motion-transmitting mechanism comprising in combination:

pulley means, said pulley means being adapted for connection to an output shaft for oscillation therewith, pitman means adapted to be connected to and receive motion from a power source and transmit that motion to oscillatory motion of said pulley means, said pitman means including a freely rotatable spool disposed adjacent said pulley, flexible means operatively connecting the freely rotatable spool and said pulley whereby reciprocatory motion of said pitman drives said pulley.

5. The structure of claim 4 wherein the flexible means has a portion drivingly disposed about the periphery of the pulley and other portions extending generally tangentially therefrom and helically disposed about the periphery of said freely rotatable spool and connected thereto at spaced-apart locations.

6. The structure of claim 5 wherein said pulley periphery is provided with grooves for receiving the flexible means.

7. A motion-transmitting mechanism comprising:

a pulley adapted to be connected to a shaft for oscillation therewith, said pulley having a grooved periphery, a bar adapted to be reciprocably driven by a power source, said bar including freely rotatable means adjacent the periphery of the pulley, and flexible means operatively engaging the grooved periphery of said pulley and having ends connected to spaced-apart locations on said rotatable means, said flexible means passing tangentially between said pulley and said rotatable means whereby reciprocation of said bar oscillates said pulley.

8. A motion-transmitting mechanism comprising:

a pulley adapted to be connected to a shaft for oscillation therewith, said pulley having a grooved periphery, a bar adapted to be reciprocably driven by a power source, said bar including freely rotatable means disposed adjacent the periphery of the pulley, and flexible means operatively engaging the grooved periphery of said pulley and having ends connected to spaced-apart locations on said rotatable means, said flexible means passing tangentially between the pulley and rotatable means and having portions helically disposed on said rotatable means whereby reciprocation of said bar oscillates said pulley.

9. The structure of claim 8 wherein the periphery of said rotatable means is provided with helical grooves.

10. The structure of claim 9 wherein flexible means is received in said grooves.

11. The structure of claim 7 wherein the freely rotatable means is mounted on an axis disposed at an angle to the axis of the output shaft.

12. The structure of claim 11 wherein the rotatable means is a spool.

13. The structure of claim 8 wherein the freely rotatable means is mounted on an axis disposed at an angle to the axis of the output shaft.

14. The structure of claim 13 wherein the rotatable means is a spool.

15. A motion-transmitting mechanism for transmitting motion from a power source to an output shaft at an angle to the output shaft comprising in combination:

pulley means adapted to be connected to an output shaft for oscillation therewith, said pulley having a grooved pulley for receiving a portion of cable means in driving relationship therewith, a bar adapted to be reciprocably driven by a power source, said bar including freely rotatable spool means disposed adjacent said pulley means, said cable means having end portions connected to said spool means at spaced-apart locations, said cable means being helically disposed on the surface of said spool means and passing tangentially between said spool means and said pulley means whereby reciprocation of said bar oscillates said pulley means.

References Cited in the file of this patent

UNITED STATES PATENTS

| 14,458 | Leavenworth | Mar. 18, 1856 |
|--------|-------------|---------------|
| 528,030 | Roak | Oct. 23, 1894 |

UNITED STATES PATENT OFFICE
CERTIFICATE OF CORRECTION

Patent No. 3,141,343            July 21, 1964

George W. Rieckenberg

It is hereby certified that error appears in the above numbered patent requiring correction and that the said Letters Patent should read as corrected below.

Column 4, line 62, for "to the operating means" read -- to operating means --.

Signed and sealed this 16th day of March 1965.

(SEAL)
Attest:

ERNEST W. SWIDER
Attesting Officer

EDWARD J. BRENNER
Commissioner of Patents